Patented May 2, 1950

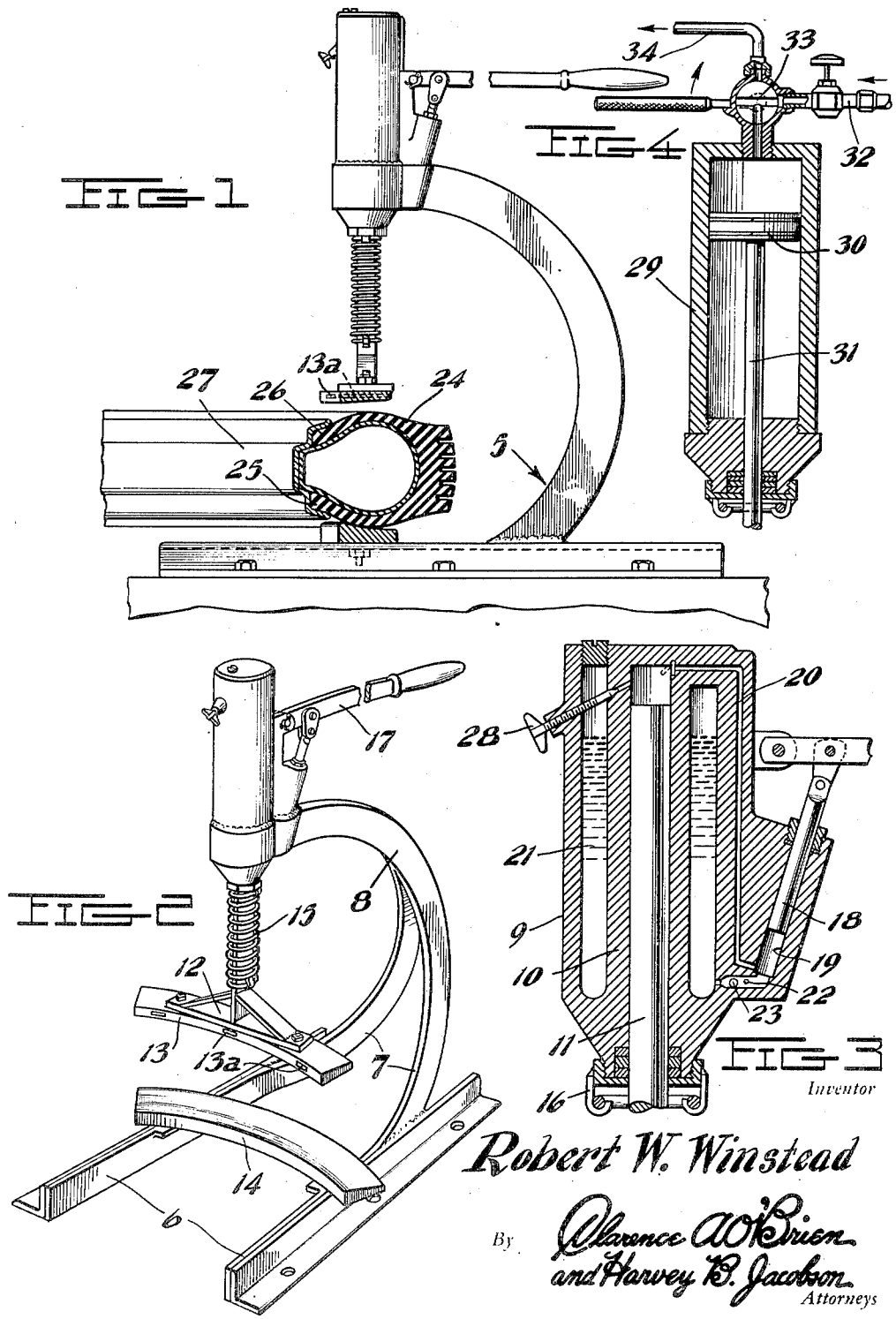

2,506,007

UNITED STATES PATENT OFFICE 2,506,007

FLUID PRESSURE ACTUATED TIRE BEAD LOOSENING DEVICE

Robert W. Winstead, Pasadena, Tex.

Application May 15, 1946, Serial No. 669,985

2 Claims. (Cl. 157—1.28)

The present invention relates to new and useful improvements in apparatus for freeing tires from drop center rims or wheels in order to facilitate removal of the tire from the rim, and to free and remove tires from rims having removable side rings such as used on trucks.

More specifically, the invention embodies the provision of a portable stand including a base for positioning under a tire when the tire is placed horizontally and providing a jack mounted in an inverted position on the stand for engaging the tire to compress the side walls thereof and thus free the beadings of the tire from the rim.

An important object of the invention is to provide an arcuate stationary clamping plate carried by the base of the stand and an upper clamping plate carried by the jack for engaging the side walls of the tire in the region of the beadings for cooperating clamping engagement with the upper and lower side walls of the tire to simultaneously free the upper and lower beadings from the rim and without danger of injury to the tire walls.

Another object of the invention is to provide hydraulic or pneumatic jack mechanism carried by the stand and including a downwardly extending plunger to which the upper clamping plate is attached for exerting the necessary pressure on the side wall of the tire to compress the walls thereof.

A further object of the invention is to provide a device of this character of simple and practical construction, which is strong and durable, efficient and reliable in use and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the device with parts broken away and shown in section.

Figure 2 is a perspective view of the device.

Figure 3 is a vertical sectional view of the jack, and

Figure 4 is a similar view of a modified jack construction adapted for operation from a compressed air line.

Referring now to the drawing in detail and first with respect to the form of invention illustrated in Figures 1 to 3 inclusive, the numeral 5 designates a portable stand generally which includes a pair of angle iron base members 6 positioned in spaced parallel relation with respect to each other and having legs 7 welded or otherwise suitably secured at their lower ends to the base member 6 and curved upwardly therefrom and terminating in a curved arm 8 overlying the base.

A hydraulic jack 9 of conventional construction is mounted in an inverted position on the end of the arm 8 and including a cylinder 10 having a plunger 11 working therein and extending downwardly therefrom.

To the lower end of the plunger 11 is attached a cross member 12 and to the underside of the cross member is secured an arcuate clamping plate 13. A similar arcuate clamping plate 14 is secured to the base members 6 immediately below the upper clamping plate 13.

A coil spring 15 has its lower end attached to the lower end of the plunger 11 and has its upper end secured to the lower portion of the jack 9 by means of hangers or hooks 16.

The jack shown in Figures 1 to 3 inclusive includes a manually operated handle 17 for working a piston 18 in a cylinder 19 which communicates with the upper end of the cylinder 10 by means of a passage 20. The jack also includes a fluid reservoir 21 which communicates with the lower portion of the cylinder 19 by means of a passage 22 having a check valve 23 therein.

Pressure is built up in the upper end of the cylinder 10 by an upward and downward stroke of the handle 17 to force the plunger 11 downwardly, so that by placing a pneumatic tire casing 24 in a horizontal position on the lower clamping plate 14 in the region of the lower beading 25, the operation of the handle 17 of the jack will force the upper clamping plate 13 downwardly to engage the upper walls of the tire in the region of the upper beading 26 thereof, to thus free the beadings from the rim 27 and to facilitate removal of the tire from the rim.

Pressure in the upper portion of the cylinder 10 is released by a valve 28 to return the fluid to the reservoir 21.

In the form of the invention illustrated in Figure 4, a modified jack cylinder 29 is illustrated having a piston 30 working therein and provided with a piston rod 31 extending downwardly therefrom and to which the upper clamping plate 13 is attached.

An air hose 32 is attached to the upper end of the cylinder 29 leading from a suitable source of compressed air and controlled by means of a two-way valve 33 of conventional construction for admitting air under pressure into the upper end of the cylinder or for exhausting the same therefrom through an exhaust pipe 34.

The plate 13 is formed with transverse openings 13a to receive shims (not shown) which may be forced between the bead of a tire and the flange of a rim should it be necessary to so apply such force to break the bead loose from the rim.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A tire removing apparatus comprising a base including a pair of spaced base members adapted for positioning under a tire when the tire is placed in a horizontal position, upwardly curved and converging arms overlying the upper wall of the tire and secured to said spaced base members, a fluid pressure operated jack having a pivoted actuation handle, mounted in an inverted position at the junction of said arms and including a downwardly extending plunger, a horizontal arcuate plate having a wedge-shaped cross section carried by the base and positioned under the tire in the region of the lower beading, and a horizontal arcuate plate having a wedge-shaped cross section carried by the plunger for exerting a downward pressure on the uppermost wall of the tire in the region of the tire beading, said plates operating to simultaneously free a tire from a rim upon a downward movement of the plunger, and said plate carried by the plunger having a plurality of transverse openings therein to accommodate spacing tools.

2. A tire removing apparatus comprising a base including a pair of base members adapted for positioning under a tire when the tire is placed in a horizontal position, upwardly curved and converging arms overlying the upper wall of the tire and secured to said pair of base members, a fluid pressure operated jack mounted in an inverted position at the junction of the arms, and including a downwardly extending plunger, a first horizontal arcuate plate carried by said base and positioned under the tire in the region of the lower beading, a second horizontal arcuate plate, its concaved edge having a vertically extending wall provided with spreading tool openings, said second horizontal arcuate plate being carried by the plunger for exerting a downward pressure on the uppermost wall of the tire in the region of the tire beading, and said first arcuate plate being wedge-shaped in cross-section, thicker at its concave edge than its convex edge.

ROBERT W. WINSTEAD.

REFERENCES CITED

The following references are of record in the file of this patent:

UNITED STATES PATENTS

| Number | Name | Date |
|---|---|---|
| 1,124,316 | Pfluemer | Jan. 12, 1915 |
| 1,178,431 | Roland | Apr. 4, 1916 |
| 1,447,113 | Woodhall | Feb. 27, 1923 |
| 1,724,813 | Weaver et al. | Aug. 13, 1929 |
| 2,281,476 | Casey | Apr. 28, 1942 |
| 2,404,583 | McCollister | July 23, 1946 |

FOREIGN PATENTS

| Number | Country | Date |
|---|---|---|
| 367,841 | France | Sept. 18, 1906 |
| 720,878 | France | Dec. 12, 1931 |